US009342111B2

(12) United States Patent
Kao et al.

(10) Patent No.: US 9,342,111 B2
(45) Date of Patent: May 17, 2016

(54) ELECTRONIC DEVICE HAVING SUPPORTING MECHANISM

(71) Applicant: Wistron Corporation, New Taipei (TW)

(72) Inventors: Ming-Chi Kao, New Taipei (TW); Jih-Hsiang Wang, New Taipei (TW)

(73) Assignee: Wistron Corporation, New Taipei (TW)

( * ) Notice: Subject to any disclaimer, the term of this patent is extended or adjusted under 35 U.S.C. 154(b) by 293 days.

(21) Appl. No.: 14/248,341

(22) Filed: Apr. 9, 2014

(65) Prior Publication Data

US 2015/0153785 A1 Jun. 4, 2015

(30) Foreign Application Priority Data

Nov. 29, 2013 (TW) .............................. 102143811 A

(51) Int. Cl.
*G06F 1/16* (2006.01)

(52) U.S. Cl.
CPC ............ *G06F 1/1679* (2013.01); *G06F 1/1681* (2013.01)

(58) Field of Classification Search
CPC ... G06F 1/1681; G06F 1/1679; G06F 1/1677; G06F 1/1675; G06F 1/1613; G06F 1/1618; Y10T 16/551; Y10T 16/5513; E05D 11/06
USPC ............. 361/679.27, 679.29, 679.41–679.44, 361/679.59; 248/346.01–346.5
See application file for complete search history.

(56) References Cited

U.S. PATENT DOCUMENTS

| | | | | |
|---|---|---|---|---|
| 5,287,245 A | * | 2/1994 | Lucente | G06F 1/1616 292/163 |
| 7,874,044 B1 | * | 1/2011 | Huang | G06F 1/1681 16/286 |
| 2009/0147469 A1 | * | 6/2009 | Chen | G06F 1/1616 361/679.55 |
| 2013/0016460 A1 | * | 1/2013 | Yeh | G06F 1/1679 361/679.01 |
| 2013/0027851 A1 | * | 1/2013 | Liao | G06F 1/1616 361/679.01 |
| 2013/0182396 A1 | * | 7/2013 | Hu | G06F 1/1681 361/729 |
| 2013/0229763 A1 | * | 9/2013 | Guo | G06F 1/1637 361/679.27 |
| 2014/0321043 A1 | * | 10/2014 | Liu | G06F 1/1654 361/679.29 |

FOREIGN PATENT DOCUMENTS

EP 0834792 4/1998

* cited by examiner

*Primary Examiner* — Hoa C Nguyen
*Assistant Examiner* — Christopher L Augustin
(74) *Attorney, Agent, or Firm* — Jianq Chyun IP Office

(57) ABSTRACT

An electronic device includes first and second bodies pivoted to each other and a supporting mechanism. The supporting mechanism includes a position-limiting component slidably disposed on the first body, a pushing component slidably disposed on the first body and a supporting component pivoted on the first body. When the second body is closed to the first body and presses the position-limiting component downward, the pushing component is limited at a first position by the position-limiting component to be away from the supporting component and the supporting component is retracted to the first body. When the second body is expanded from the first body, the position-limiting component is adapted to move upward to release the pushing component and the pushing component is adapted to move to a second position to push the supporting component, such that the supporting component is expanded from the first body and supports the second body.

14 Claims, 9 Drawing Sheets

ELECTRONIC DEVICE HAVING SUPPORTING MECHANISM

CROSS-REFERENCE TO RELATED APPLICATION

This application claims the priority benefit of Taiwan application serial no. 102143811, filed on Nov. 29, 2013. The entirety of the above-mentioned patent application is hereby incorporated by reference herein and made a part of this specification.

BACKGROUND

1. Field of the Invention

The invention is directed to an electronic device and more particularly, to an electronic device having a supporting mechanism.

2. Description of Related Art

With advanced semiconductor elements and technology of displays, electronic devices are constantly developed toward being small, multi-functional, and easy to carry. Common portable electronic devices include tablet PCs, smart phones, notebook computers, and so forth. Take the notebook computers for example, a notebook computer is generally composed of a host and a display screen, and the host and the display are pivoted to each other by at a hinge structure. A user may close the display to the host of the notebook computer by way of rotating the display relatively to the host for easy portability, and when needing to use the notebook computer, the user expands the display for easy manipulation.

More and more notebook computers are equipped with a touch display screen. When the user touches the display screen for manipulation, a force of pressing the display causes the display screen to sway, which leads to visual discomfort and operational difficulty of the user.

SUMMARY

The invention provides an electronic device capable of preventing the body of the electronic device from swaying.

The invention is directed to an electronic device, including a first body, a second body and a supporting mechanism. The second body is pivoted to the first body. The supporting mechanism includes a position-limiting component, a pushing component and a supporting component. The position-limiting component is slidably disposed on the first body along a first direction. The pushing component is slidably disposed on the first body along a second direction. The supporting component is pivoted to the first body. When the second body is closed to the first body and presses the position-limiting component downward, the pushing component is limited at a first position by the position-limiting component to be away from the supporting component, and the supporting component is retracted to the first body. When the second body is expanded from the first body, the position-limiting component is adapted to move upward to release the pushing component, and the pushing component is adapted to move to a second position to push the supporting component, such that the supporting component is expanded from the first body and supports the second body.

In an embodiment of the invention, the supporting mechanism further includes a first elastic component. The first elastic component is connected between the position-limiting component and the first body. When the second body is closed to the first body, the second body resists an elastic force of the first elastic component to press the position-limiting component downward. When the second body is expanded from the first body, the position-limiting component moves upward by the elastic force of the first elastic component and releases the pushing component.

In an embodiment of the invention, the first body has a protrusion portion, the position ting component has a recess portion, the protrusion portion is aligned to the recess portion, and the first elastic component is fitted around the protrusion portion and at least partially contained in the recess portion.

In an embodiment of the invention, the pushing component has an open slot. The protrusion portion passes through the open slot and extends toward the recess portion. A length of the open slot along the second direction is greater than an outer diameter of the protrusion portion.

In an embodiment of the invention, the supporting mechanism further includes at least one second elastic component. The second elastic component is connected between the pushing component and the first body. When the second body presses the position-limiting component downward, the position-limiting component resists an elastic force of the second elastic component to limit the pushing component at the first position, and when the position-limiting component releases the pushing component, the pushing component moves to the second position from the first position by the elastic force of the second elastic component.

In an embodiment of the invention, a number of the at least one second elastic component is two, and the two second elastic components are respectively located at two opposite sides of the pushing component.

In an embodiment of the invention, the supporting mechanism further includes a third elastic component. The third elastic component is connected between the supporting component and the first body, when the pushing component is located at the first position, the supporting component is retracted to the first body by an elastic force of the third elastic component, and when the pushing component is located at the second position, the pushing component resists the elastic force of the third elastic component to push the supporting component, such that the supporting component is expanded from the first body.

In an embodiment of the invention, when the pushing component moves to the first position from the second position, the supporting component is retracted to the first body by gravity.

In an embodiment of the invention, the position-limiting component has a pressing portion and a position-limiting portion, the first body has an opening, and the pressing portion is slidably disposed on the first body through the opening. When the second body is closed to the first body, the second body presses the pressing portion downward, and the position-limiting portion limits the pushing component at the first position.

In an embodiment of the invention, the first direction is perpendicular to the second direction. The position-limiting component has a first slope. When the position-limiting component moves downward along the first direction, the position-limiting component pushes the pushing component with the first slope, such that the pushing component moves along the second direction to the first position from the second position.

In an embodiment of the invention, the pushing component has a second slope and adapted to push the supporting component with the second slope.

In an embodiment of the invention, the pushing component has at least one sliding slot, the first body has at least one post, and the post passes through the sliding slot, such that the pushing component is slidably disposed on the first body.

In an embodiment of the invention, the supporting component has a driven portion and a supporting portion. The pushing component pushing component is adapted to push the driven portion to drive the supporting component to rotate, such that the supporting portion is expanded from the first body and supports the second body.

In an embodiment of the invention, the electronic device further includes an electronic member disposed on the supporting portion. When the supporting portion is retracted to the first body, the electronic member is hidden in the first body, and when the supporting portion is expanded from the first body, the electronic member moves out of the first body.

To sum up, the electronic device of the invention has the supporting mechanism disposed on the first body, and the supporting mechanism includes the position component, the pushing component and the supporting component. When a user closes the second body to the first body, the second body presses the position-limiting component downward to limit the pushing component by the position-limiting component. In this scenario, the pushing component does not push the supporting component, such that the supporting component is retracted to the first body. When the user expands the second body from the first body, the position-limiting component is no longer pressed downward by the second body and is adapted to move upward to release the pushing component, and the pushing component is adapted to push the supporting component, such that the supporting component is expanded from the first body and supports the second body. In this way, the second body can be prevented from swaying due to the force applied by the user, and thus, the user can operate the electronic device more smoothly.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
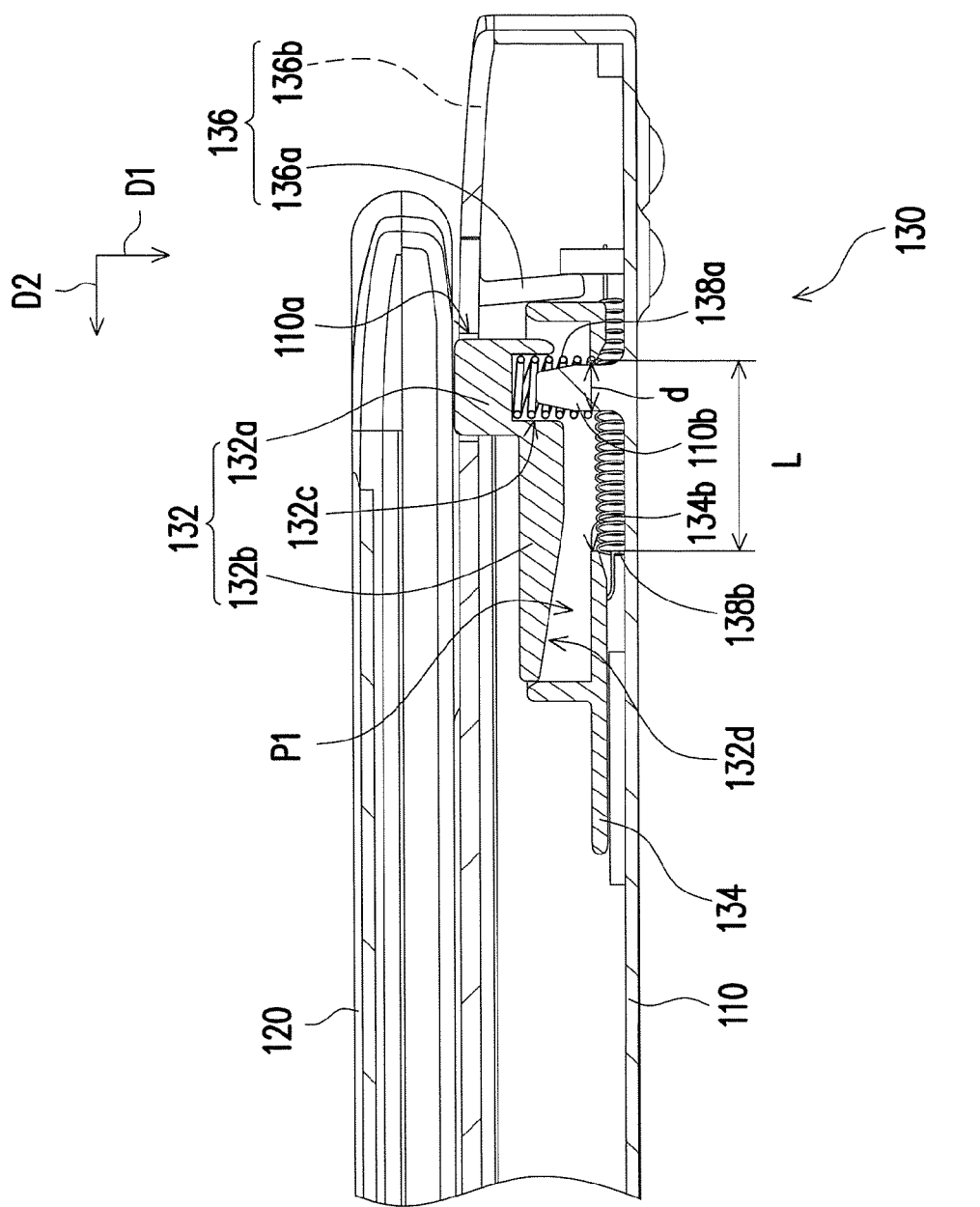
FIG. 1 is a partially cross-sectional view of an electronic device according to an embodiment of the invention.
Figure 2:
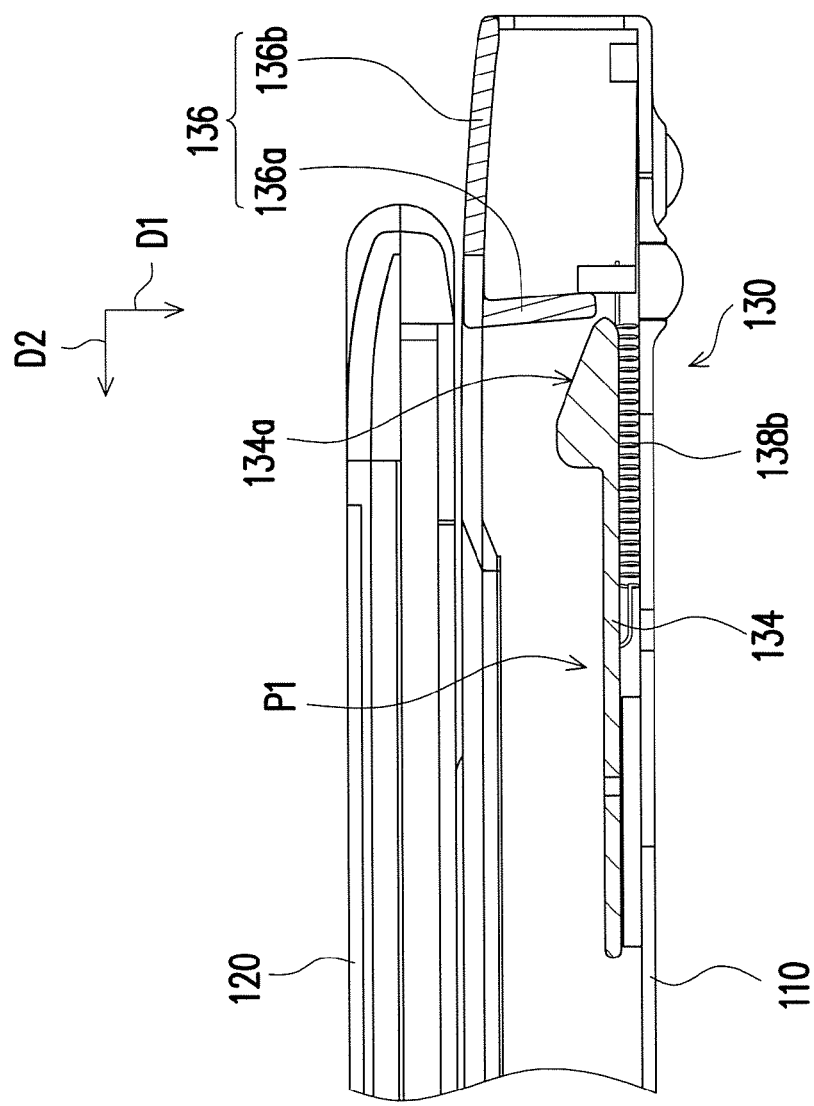
FIG. 2 is a partially cross-sectional view of the components of the electronic device illustrated in FIG. 1 along another section.

FIG. 1 is a partially cross-sectional view of an electronic device according to an embodiment of the invention. FIG. 2 is a partially cross-sectional view of the components of the electronic device illustrated in FIG. 1 along another section. With reference to FIG. 1 and FIG. 2, an electronic device 100 of the present embodiment is, for example, a notebook computer and includes a first body 110, a second body 120 and a supporting mechanism 130. The first body 110 and the second body 120 are, for example, respectively a host and a display of the notebook computer and pivoted to each other. The supporting mechanism 130 includes a position-limiting component 132, a pushing component 134 and a supporting component 136. The position-limiting component 132 is slidably disposed on the first body 110 along a first direction D1, the pushing component 134 is slidably disposed on the first body 110 along a second direction D2 which is perpendicular to the first direction D1, and the supporting component 136 is pivoted to the first body 110.

Figure 3A:
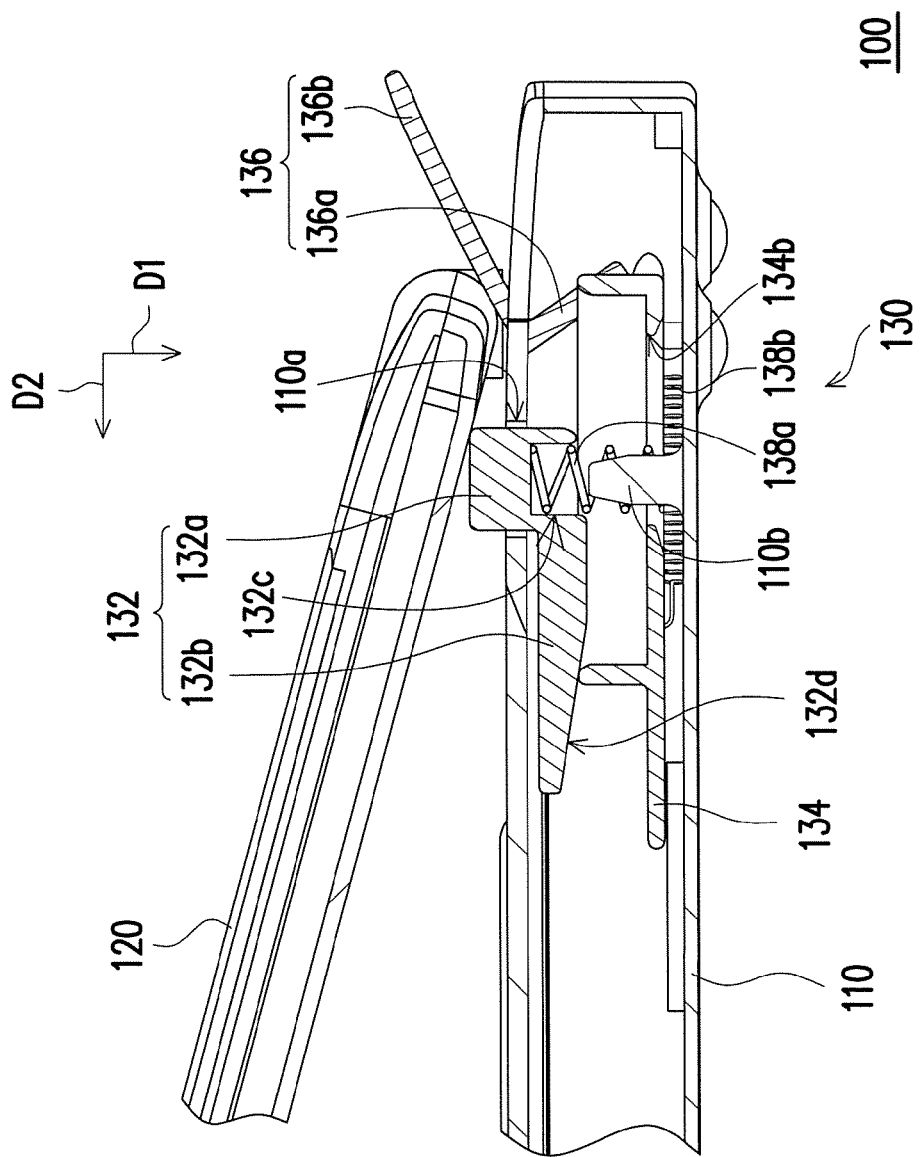
FIG. 3A and FIG. 3B illustrate an operation flow of the supporting mechanism illustrated in FIG. 1.
Figure 3B:
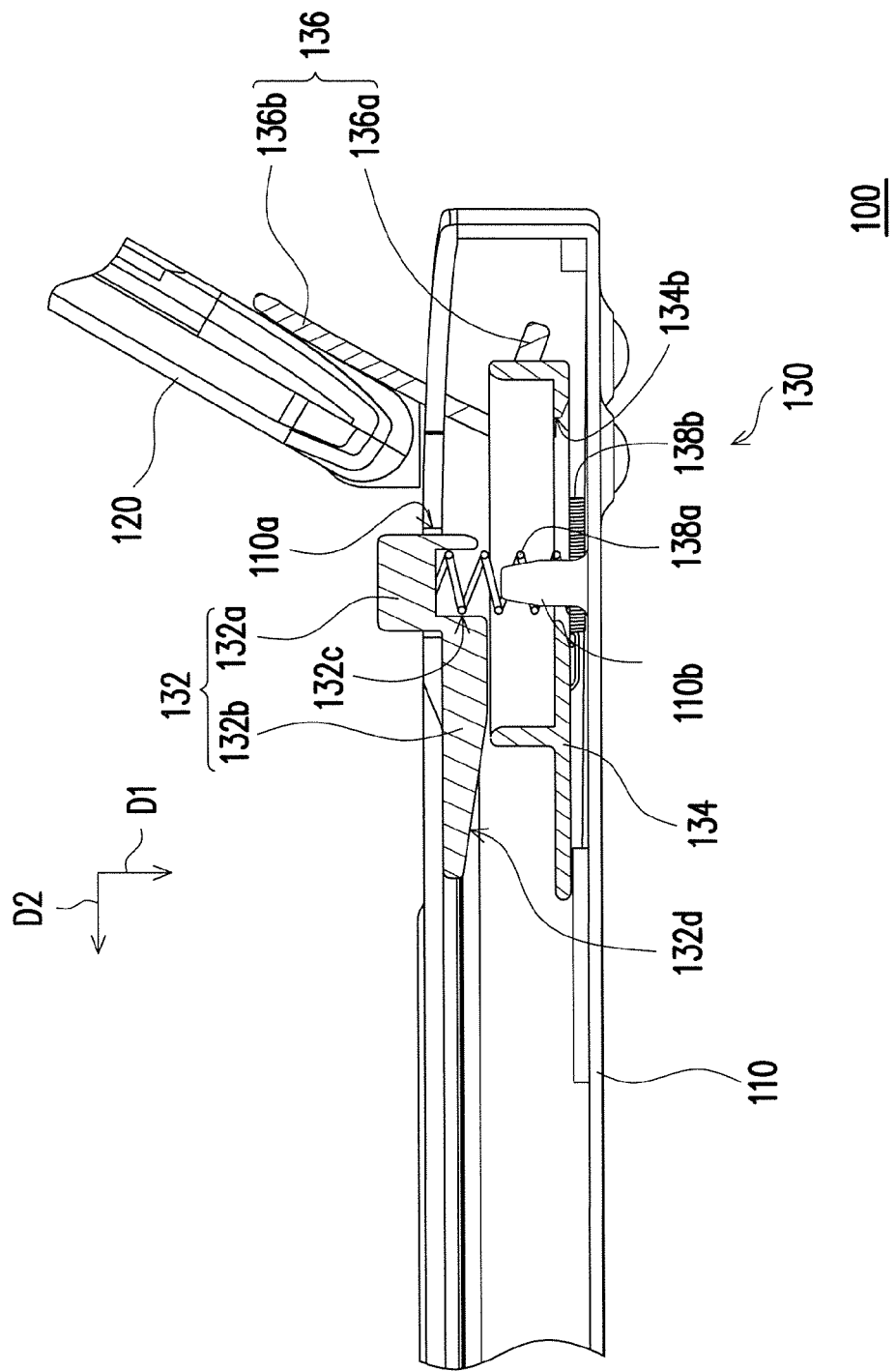
Figure 4A:
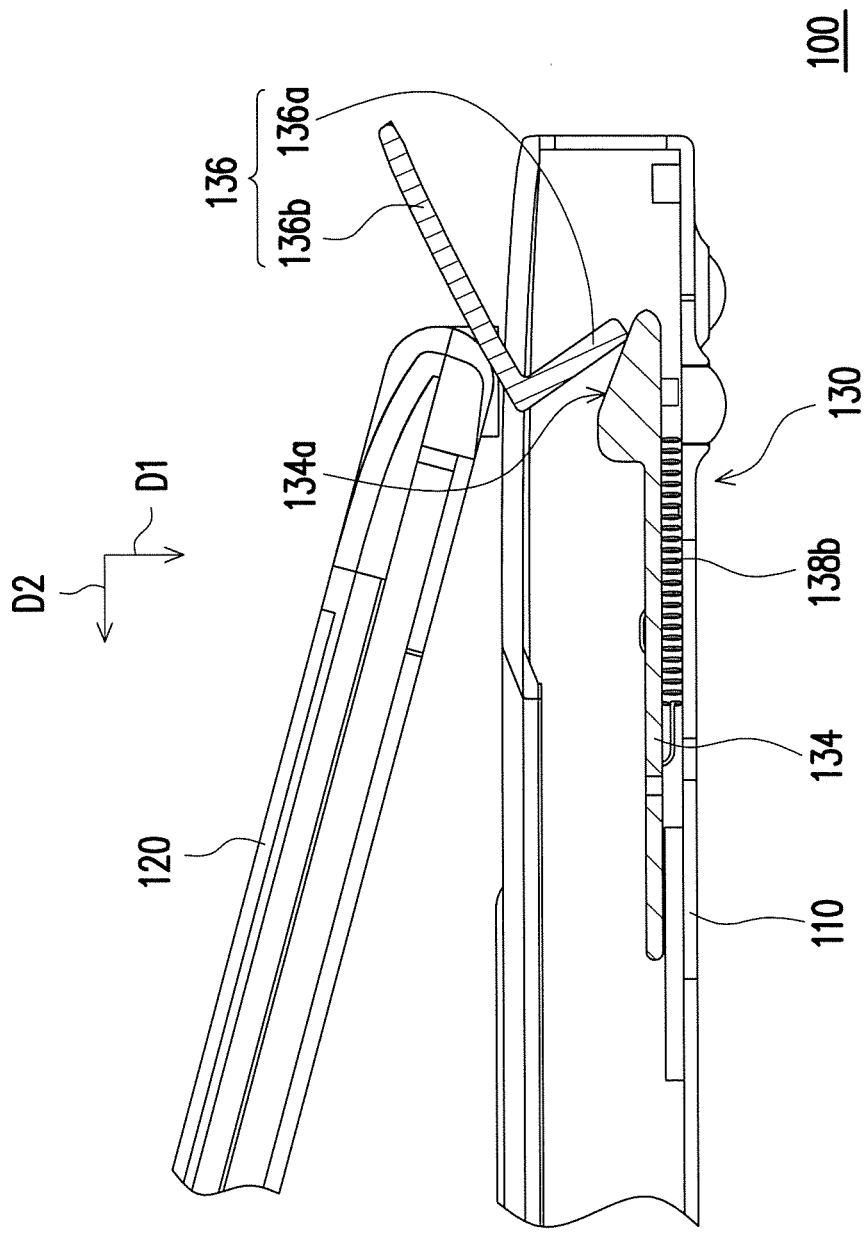
FIG. 4A and FIG. 4B are partially cross-sectional views of the components illustrated in FIG. 3A and FIG. 3B along another section.
Figure 4B:
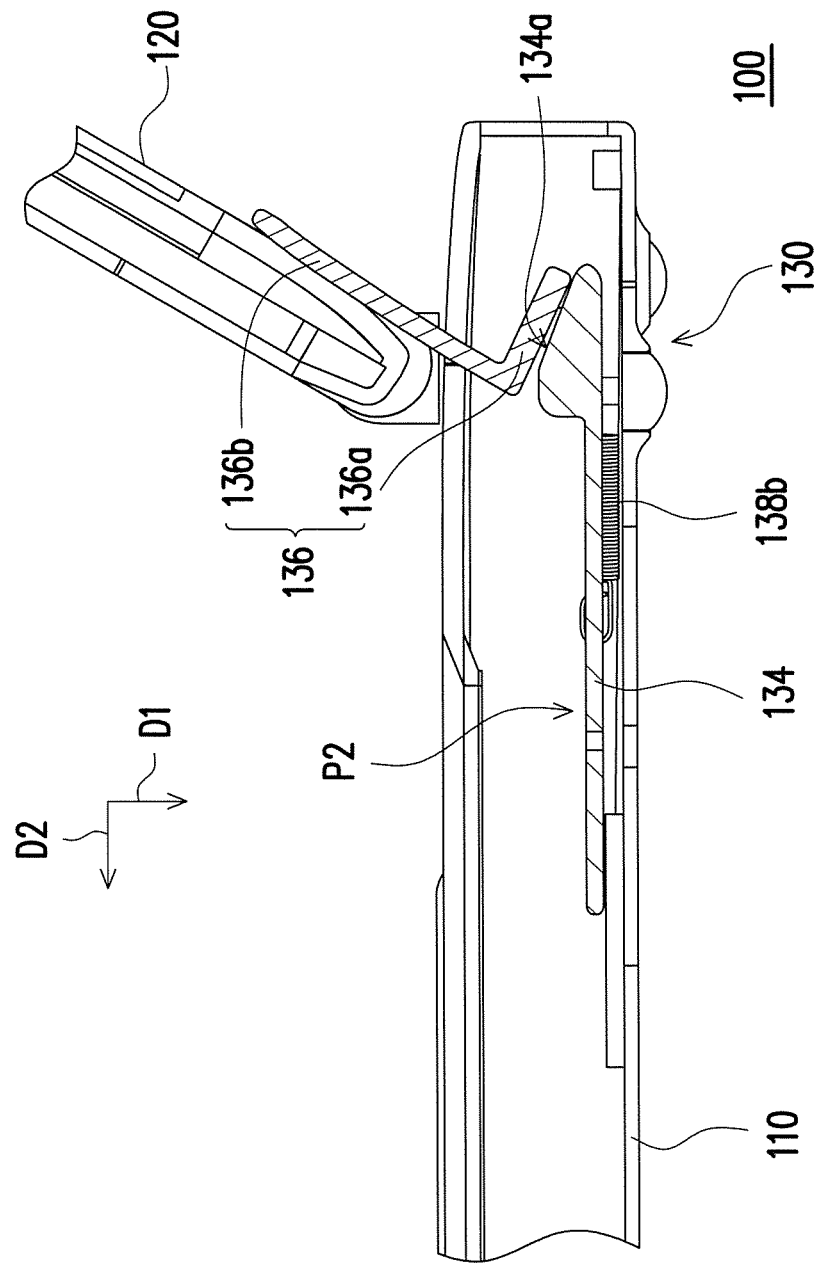

FIG. 3A and FIG. 3B illustrate an operation flow of the supporting mechanism illustrated in FIG. 1. FIG. 4A and FIG. 4B are partially cross-sectional views of the components illustrated in FIG. 3A and FIG. 3B along another section. Referring to FIG. 1 and FIG. 2, when the second body 120 is closed to the first body 110 and presses the position-limiting component 132 downward, the pushing component 134 is limited at a first position P1 by the position-limiting component 132 and is away from the supporting component 136, and the supporting component 136 is retracted to the first body 110. Referring to FIG. 3A through FIG. 3B and FIG. 4A through FIG. 4B, when the second body 120 is expanded from the first body 110, the position-limiting component 132 is adapted to move upward to release the pushing component 134, and the pushing component 134 is adapted to move to a second position P2 to push the supporting component 136, a shown in FIG. 4B, such that the supporting component 136 is expanded from the first body 110 and supports the second body 120.

Under the aforementioned disposition, when a user wants to accommodate or carry the electronic device 100 and closes the second body 120 to the first body 110, the second body 120 presses the position-limiting component 132 downward to limit the pushing component 134 by the position-limiting component 132. In this scenario, the pushing component 134 does not push the supporting component 136, such that the supporting component 136 is retracted to the first body 110. When the user wants to operates the electronic device 100 and expands the second body 120 from the first body 110, the position-limiting component 132 is no longer pressed downward by the second body 120 and is adapted to move upward to release the pushing component 134, and the pushing component 134 is adapted to push the supporting component 136, such that the supporting component 136 is expanded from the first body 110 and supports the second body 120. Thereby, the second body 120 may be prevented from swaying due to a force applied by the user when performing touch input, such that the user can operate the electronic device 100 more smoothly. Detail description with respect to disposition and operation of the supporting mechanism 130 of the present embodiment will be set forth below.

With reference to FIG. 1, the first body 110 of the present embodiment has an opening 110a and a protrusion portion 110b, and the position-limiting component 132 has a pressing portion 132a and a position-limiting portion 132b. The pressing portion 132a of the position-limiting component 132 has a recess portion 132c aligned to the protrusion portion 110b, the pressing portion 132a is slidably disposed on the first body 110 through the opening 110a. The supporting mechanism 130 further includes a first elastic component 138a. The first elastic component 138a is, for example, a compression spring, and is fitted around the protrusion portion 110b and partially contained in the recess portion 132c, such that the first elastic component 138a is connected between the pressing portion 132a of the position-limiting component 132 and the first body 110.

When the second body 120 is closed to the first body 110, as shown in FIG. 1, the second body 120 resists an elastic force of the first elastic component 138a to press the pressing portion 132a of the position-limiting component 132 downward, such that the position-limiting portion 132b limits the pushing component 134 at the first position P 1. When the second body 120 is expanded from the first body 110, as shown in FIG. 3A through FIG. 3B, the position-limiting component 132 automatically moves upward by the elastic force of the first elastic component 138a to release the pushing component 134, such that the pushing component 134 may move to a second position P2, as shown in FIG. 3B and the FIG. 4B to drive the supporting component 136 to expand from the first body 110.

The position-limiting portion 132b of the position-limiting component 132 of the present embodiment has a first slope 132d. When the user closes the second body 120 to the first body 110, such that the position-limiting component 132 is pressed downward by the second body 120 to move downward along the first direction D1, the position-limiting component 132 pushes the pushing component 134 by the first slope 132d thereof to drive the pushing component 134 to move along the second direction D2 from the second position P2 to the first position P1, such that the supporting component 136 is no longer pushed by the pushing component 134 and returns from the expanded state illustrated in FIG. 3B and FIG. 4B to the retracted state illustrated in FIG. 1 and FIG. 2.

In the present embodiment, the pushing component 134 has an open slot 134b, and the protrusion portion 110b of the first body 110 passes through the open slot 134b and extends toward the recess portion 132c of the position-limiting component 132. A length L of the open slot 134b along the second direction D2 is greater than an outer diameter d of the protrusion portion 110b, and in this way, the pushing component 134 may move smoothly along the second direction D2.

With reference to FIG. 1 and FIG. 2, the supporting mechanism 130 of the present embodiment further includes at least one second elastic component 138b. The at least one second elastic component 138b is, for example, a tension spring and connected between the pushing component 134 and the first body 110. When the second body 120 presses the position-limiting component 132 downward, as shown in FIG. 1 and FIG. 2, the position-limiting component 132 resists an elastic force of the at least one second elastic component 138b to limit the pushing component 134 at the first position P1. When the position-limiting component 132 moves upward, as shown in FIG. 3B and FIG. 4B to release the pushing component 134, the pushing component 134 automatically from the first position P1 to the second position P2 by the elastic force of the at least one second elastic component 138b.

Figure 5:
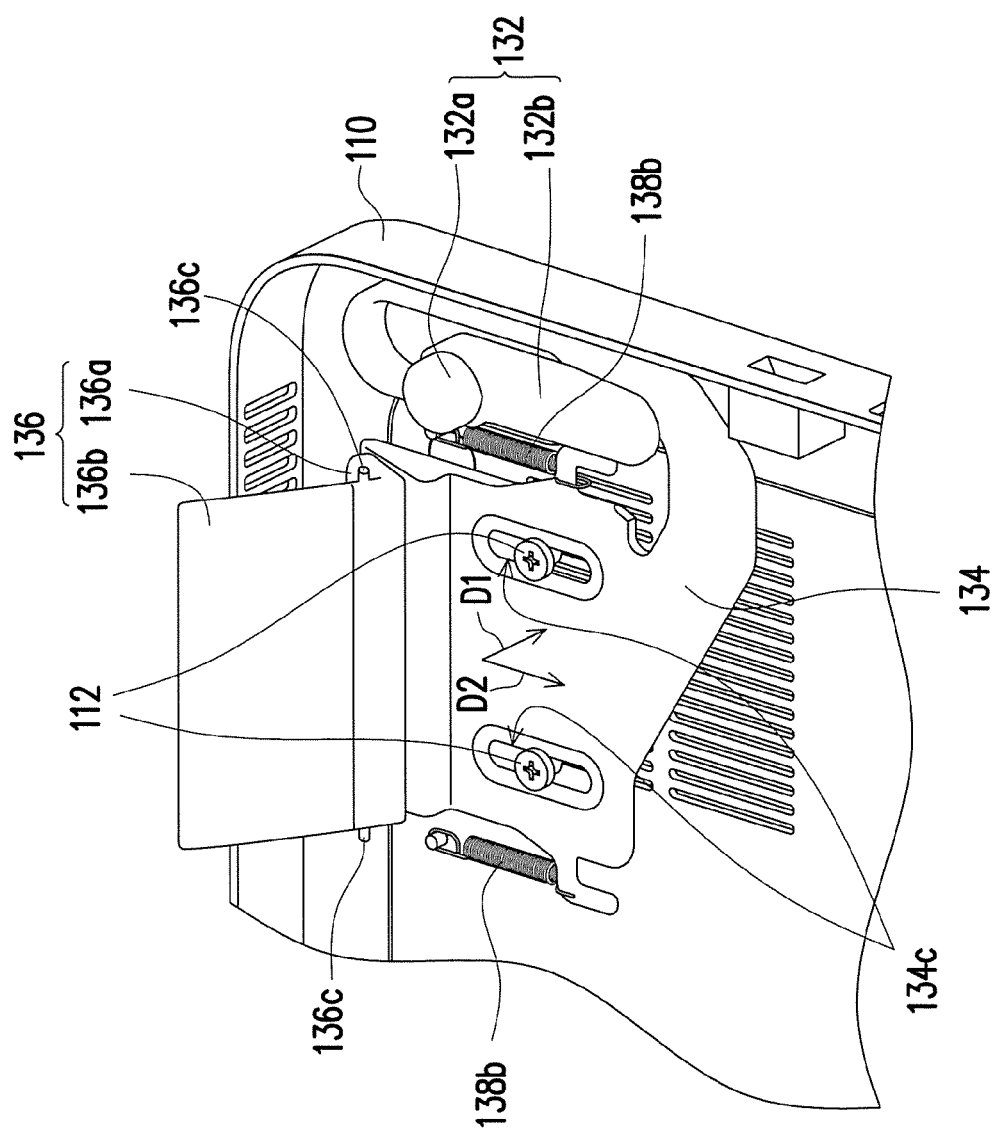
FIG. 5 is a perspective view of part of the components of the electronic device illustrated in FIG. 3B and FIG. 4B.

FIG. 5 is a perspective view of part of the components of the electronic device illustrated in FIG. 3B and FIG. 4B. With reference to FIG. 5, in the present embodiment, a number of the at least one second elastic component 138b is, for example, two, and the two second elastic components 138b are respectively located at two opposite sides of the pushing component 134 to ensure that the pushing component 134 may stably moves along the second direction D2 without tilting. Additionally, in the present embodiment, the pushing component 134 has at least one sliding slot 134c (which is illustrated as two), the first body 110 has at least one post 112 (which is illustrated as two), and the two posts 112 are, for example, screws. The screws are fastened to a casing of the first body 110 and respectively pass through the two sliding slots 134c, such that the pushing component 134 is slidably disposed on the first body 110. In other embodiments, pushing component 134 may be slidably disposed on the first body 110 by any other proper manner, which is not limited in the invention.

In the present embodiment, when the pushing component 134 moves from the second position P2 illustrated in FIG. 3B and FIG. 4B to the first position P1 illustrated in FIG. 1 and FIG. 2 and does not push the supporting component 136, the supporting component 136, for example, automatically pivots by gravity to the state as shown in FIG. 1 and FIG. 2 and is retracted to the first body 110. However, the invention is not limited thereto. In other embodiments, the supporting component 136 may also be retracted to the first body 110 by an elastic force of an elastic component. For instance, the supporting mechanism 130 may include a third elastic component (not shown). The third elastic component is, for example, a torsion spring and connected between the supporting component 136 and the first body 110, when the pushing component 134 is located at the second position P2, the pushing component 134 resists an elastic force of the third elastic component to push the supporting component 136, such that the supporting component 136 is expanded from the first body 110. When the pushing component 134 is located at the first position P1 and does not push the supporting component 136, the supporting component 136 is retracted to the first body 110 by the elastic force of the third elastic component.

With reference to FIG. 2 and FIG. 5, the supporting component 136 of the present embodiment has a driven portion 136a and a supporting portion 136b. The driven portion 136a and the supporting portion 136b form, for example, an L-shaped structure. The pushing component 134 has a second slope 134a and is adapted to push the driven portion 136a of the supporting component 136 by the second slope 134a, as shown in FIG. 4A through FIG. 4B, to drive the supporting component 136 to rotate, such that the supporting portion 136b is expanded from the first body 110 and supports the second body 120.

Referring to FIG. 5, in the present embodiment, the supporting component 136 has two hinges 136c and is pivoted to partial structure (not shown) of the first body 110 by the hinges 136c. In other embodiments, the supporting component 136 may be pivoted to the first body 110 in any other proper manner, which is not limited in the invention.

Figure 6:
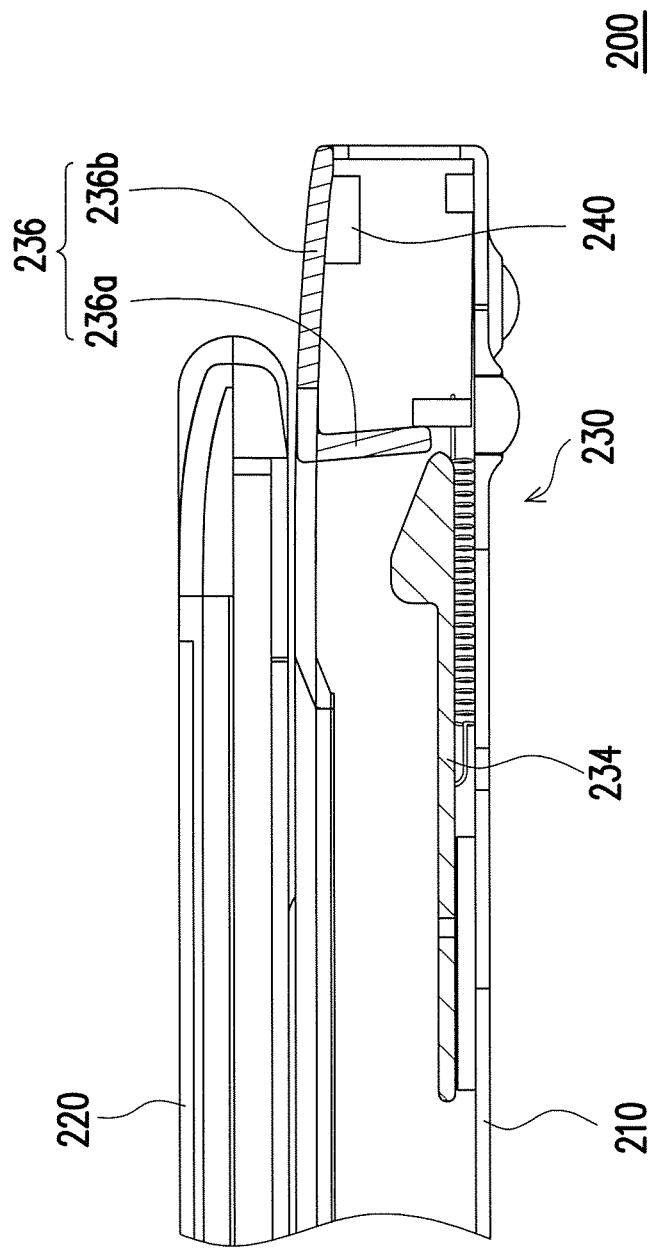
FIG. 6 is a partially cross-sectional view of part of components of an electronic device according to another embodiment of the invention.
Figure 7:
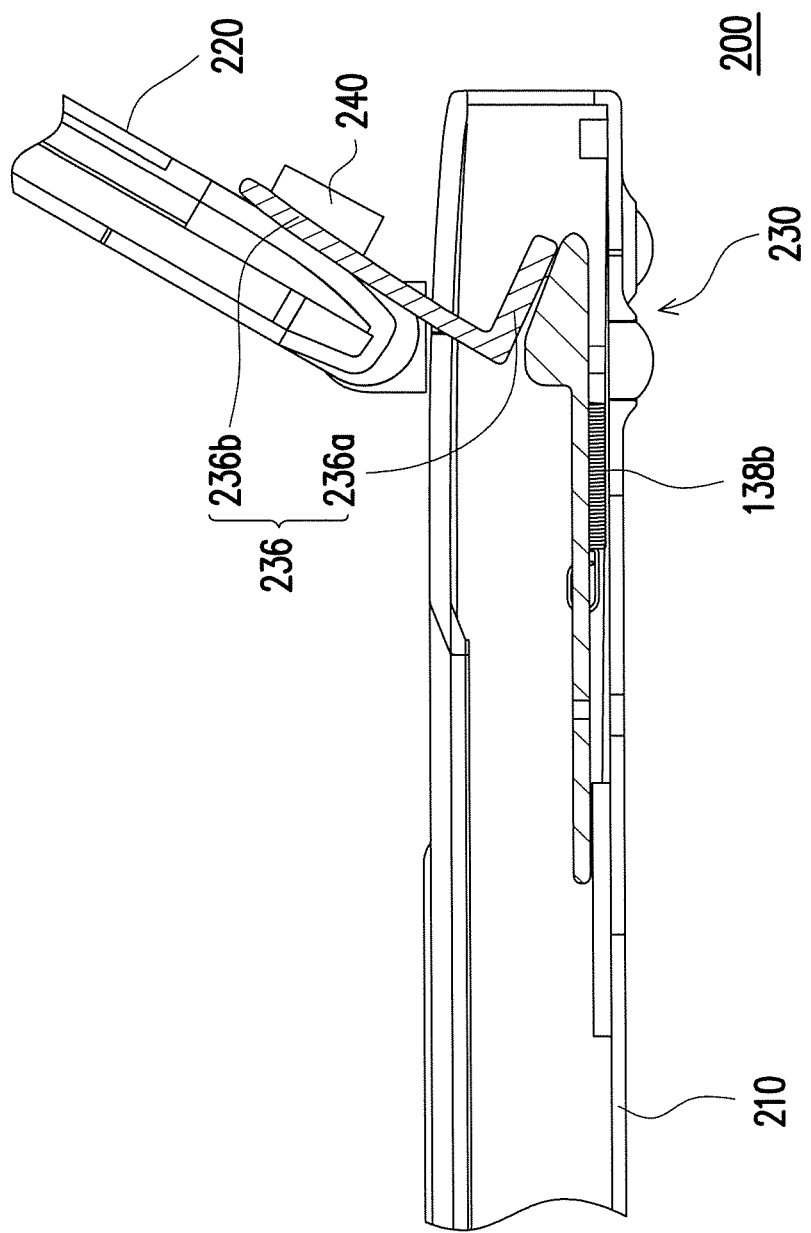
FIG. 7 is a partially cross-sectional view of the second body illustrated in FIG. 6 being expanded from the first body.

FIG. 6 is a partially cross-sectional view of part of components of an electronic device according to another embodiment of the invention. FIG. 7 is a partially cross-sectional view of the second body illustrated in FIG. 6 being expanded from the first body. In an electronic device 200 of the present embodiment, a first body 210, a second body 220, a supporting mechanism 230, a position-limiting component (not shown), a pushing component 234, a supporting component 236, a driven portion 236a and a supporting portion 236b are disposed and operated in a similar manner to the first body 110, the second body 120, the supporting mechanism 130, the position-limiting component 132, the pushing component 134, the supporting component 136, the driven portion 136a and the supporting portion 136b of the embodiment above, and will not be repeatedly described hereinafter. The electronic device 200 is different from the electronic device 100 in that the electronic device 200 further includes an electronic member 240. The electronic member 240 is, for example, a speaker and disposed on the supporting portion 236b of the supporting component 236. When the supporting portion 236b is retracted to the first body 210, as shown in FIG. 6, the electronic member 240 is hidden in the first body 210. When the supporting portion 236b is expanded from the first body 210, as shown in FIG. 7, the electronic member 240 is moved out of the first body 210, such that the electronic member 240 (speaker) and a built-in speaker (not shown) of the electronic device 200 collectively produce surround sound effect, and thereby, sound-output quality of the electronic device 200 can be improved. Additionally, since the electronic member 240 (speaker) may be moved out of the first body 210 as shown in FIG. 7, the operation of a hard disc (not shown) inside the first body 210 may be prevented from being affected by vibration of the electronic member 240 (speaker). In other embodiments, the electronic member 240 may be an antenna of the electronic device 200, the electronic member 240 (antenna) may be located out of the first body 210 as shown in FIG. 7 along with the movement of the supporting component 230, and thereby, signal-receiving quality of the electronic device 200 can be improved.

In light of the foregoing, the electronic device of the invention has the supporting mechanism disposed on the first body, and the supporting mechanism includes the position-limiting component, the pushing component and the supporting component. When the user closes the second body to the first body, the second body presses the position-limiting component downward to limit the pushing component by the position-limiting component. In this scenario, the pushing component does not push the supporting component, such that the supporting component is retracted to the first body. When the user expands the second body from the first body, the position-limiting component is no longer pressed downward by the second body and is adapted to automatically move upward by the elastic force of the first elastic component and release the pushing component, and the pushing component is adapted to automatically push the supporting component by the elastic force of the second elastic component, such that the supporting component is expanded from the first body and supports the second body. Thereby, the second body can be prevented from swaying due to the force applied by the user, and thus, the user can operate the electronic device more smoothly.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. An electronic device, comprising:
   a first body;
   a second body, pivoted to the first body; and
   a supporting mechanism, comprising:
      a position-limiting component, slidably disposed on the first body along a first direction;
      a pushing component, slidably disposed on the first body along a second direction; and
      a supporting component, pivoted to the first body, wherein when the second body is closed to the first body and presses the position-limiting component downward, the pushing component is limited at a first position by the position-limiting component to be away from the supporting component and the supporting component is retracted to the first body, and when the second body is expanded from the first body, the position-limiting component is adapted to move upward to release the pushing component and the pushing component is adapted to move to a second position to push the supporting component, such that the supporting component is expanded from the first body and supports the second body.

2. The electronic device according to claim 1, wherein the supporting mechanism further comprises a first elastic component, the first elastic component is connected between the position-limiting component and the first body, when the second body is closed to the first body, the second body resists an elastic force of the first elastic component to press the position-limiting component downward, and when the second body is expanded from the first body, the position-limiting component moves upward by the elastic force of the first elastic component and releases the pushing component.

3. The electronic device according to claim 2, wherein the first body has a protrusion portion, the position-limiting component has a recess portion, the protrusion portion is aligned to the recess portion, and the first elastic component is fitted around the protrusion portion and at least partially contained in the recess portion.

4. The electronic device according to claim 3, wherein the pushing component has an open slot, the protrusion portion passes through the open slot and extends toward the recess portion, and a length of the open slot along the second direction is greater than an outer diameter of the protrusion portion.

5. The electronic device according to claim 1, wherein the supporting mechanism further comprises at least one second elastic component, the second elastic component is connected between the pushing component and the first body, when the second body presses the position-limiting component downward, the position-limiting component resists an elastic force of the second elastic component to limit the pushing component at the first position, and when the position-limiting component releases the pushing component, the pushing component moves to the second position from the first position by the elastic force of the second elastic component.

6. The electronic device according to claim 5, wherein a number of the at least one second elastic component is two, and the two second elastic components are respectively located at two opposite sides of the pushing component.

7. The electronic device according to claim 1, wherein the supporting mechanism further comprises a third elastic component, the third elastic component is connected between the supporting component and the first body, when the pushing component is located at the first position, the supporting component is retracted to the first body by an elastic force of the third elastic component, and when the pushing component is located at the second position, the pushing component resists the elastic force of the third elastic component to push the supporting component, such that the supporting component is expanded from the first body.

8. The electronic device according to claim 1, wherein when the pushing component moves to the first position from the second position, the supporting component is retracted to the first body by gravity.

9. The electronic device according to claim 1, wherein the position-limiting component has a pressing portion and a position-limiting portion, the first body has an opening, the pressing portion is slidably disposed on the first body through the opening, and when the second body is closed to the first body, the second body presses the pressing portion downward, and the position-limiting portion limits the pushing component at the first position.

10. The electronic device according to claim 1, wherein the first direction is perpendicular to the second direction, the position-limiting component has a first slope, and when the position-limiting component moves downward along the first direction, the position-limiting component pushes the pushing component with the first slope, such that the pushing component moves along the second direction to the first position from the second position.

11. The electronic device according to claim 1, wherein the pushing component has a second slope and adapted to push the supporting component with the second slope.

12. The electronic device according to claim 1, wherein the pushing component has at least one sliding slot, the first body has at least one post, and the post passes through the sliding slot, such that the pushing component is slidably disposed on the first body.

13. The electronic device according to claim 1, wherein the supporting component has a driven portion and a supporting portion, and the pushing component is adapted to push the driven portion to drive the supporting component to rotate, such that the supporting portion is expanded from the first body and supports the second body.

14. The electronic device according to claim 13, further comprising:
   an electronic member, disposed on the supporting portion, wherein when the supporting portion is retracted to the first body, the electronic member is hidden in the first body, and when the supporting portion is expanded from the first body, the electronic member moves out of the first body.

* * * * *